United States Patent Office 2,958,784
Patented Nov. 1, 1960

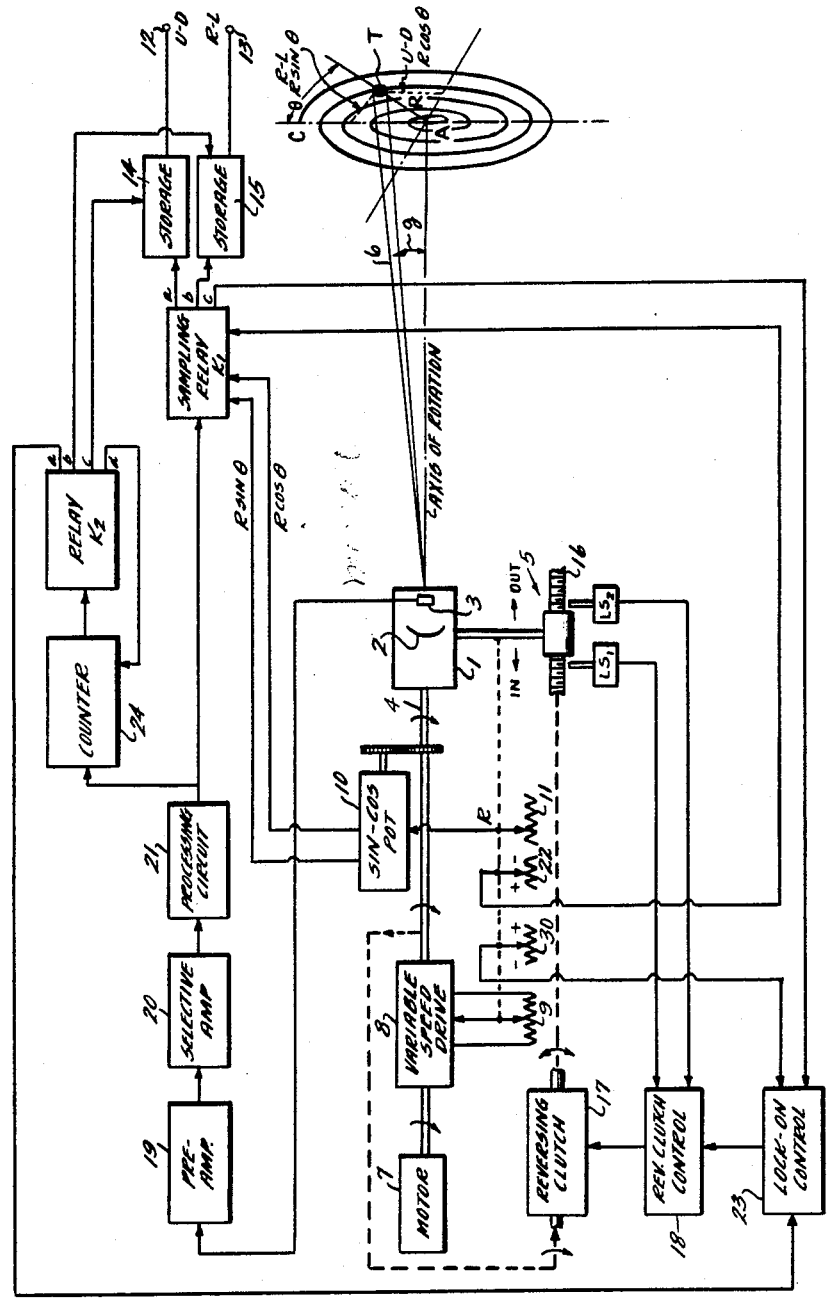

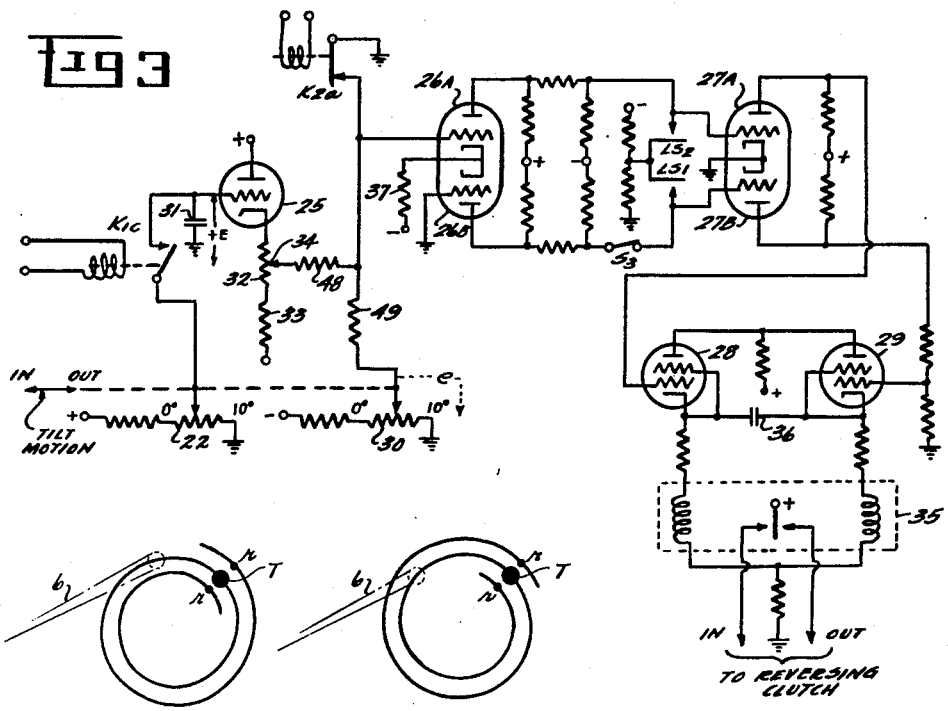
Fig 3
Fig 2b
Fig 2a
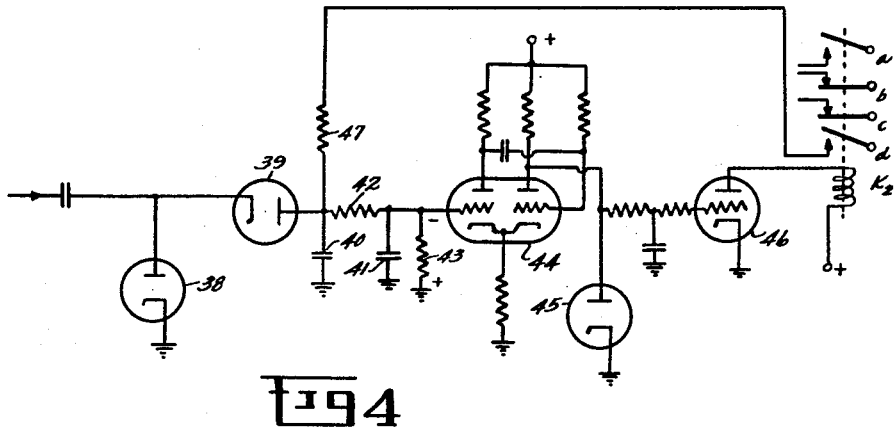
Fig 4
INVENTORS.
HENRY BLACKSTONE
WARREN A. WIENER
BY James S. Shannon
AGENT
Wade Kovitz
ATTORNEY

2,958,784

METHOD OF AND APPARATUS FOR STEP REDUCTION OF A SCANNED FIELD

Henry Blackstone, New Hyde Park, and Warren A. Wiener, Islip, N.Y., assignors to the United States of America as represented by the Secretary of the Air Force Filed Jan. 14, 1954, Ser. No. 404,149

11 Claims. (Cl. 250—203)

This invention relates in general to target seekers such as used to direct a guided missile to a target and is particularly directed to target seeker scanning systems of the type in which the scanning beam generates a cone of continuously varying apex angle.

In such scanning systems the scanning beam is rotated and at the same time its angle of tilt is continuously varied back and forth between zero and a maximum value with the result that the scanning pattern produced by the scanning beam in a plane perpendicular to the scanning axis is a spiral. It is the object of the invention to provide a scanning system of this type in which the tilt angle varies between zero and maximum during the search phase but is restricted to a small deviation either side of the target tilt angle during the target lock-on phase of operation. Scanning during the lock-on phase is thus limited to a small annulus including the target, which results in improved target discrimination and increases the rate at which target information is received.

Briefly, the above object is accomplished by generating a voltage proportional to the target tilt angle and comparing this voltage with a voltage representing the instantaneous tilt angle of the beam. When these voltages differ by a predetermined amount the tilt mechanism of the scanner is reversed.

A more detailed description of the invention will be given in connection with the accompanying drawings, in which Fig. 1 is a block diagram of a target seeker employing a scanning system containing the invention;

Figs. 2a and 2b illustrate the limitation of the spiral scan during the lock-on phase;

Fig. 3 is a schematic diagram of the lock-on control system in accordance with the invention; and Fig. 4 is a diagram of the counter and relay K2 in Fig. 1.

Fig. 1 shows the invention applied to a spiral scanner of the infra-red sensitive type. Referring to this figure, 1 represents an infra-red sensitive scanning head having a parabolic mirror 2 and a bolometer 3 located in front of the mirror. The mirror is rotated by shaft 4 and at the same time its optical axis is tilted by tilt mechanism 5, the sum of these two motions producing the spiral scan shown. Two methods of supporting the bolometer are possible. The bolometer may either be mounted at the focal point of the mirror, in which case it moves with the mirror and the tilt angle of the mirror equals the beam tilt angle $g$, or it may have a stationary support so that it remains in a fixed position, in which case the mirror tilt angle equals $g/2$. The first method, while giving a uniform signal over the scanned field, has the disadvantage that microphonics are generated in the bolometer and its output signal lead due to the bolometer motion. In the second method the signal output decreases with increasing tilt angle but the difficulty with microphonics is avoided. The mirror is designed to produce a beamwidth of about 1° and the tilt mechanism is designed to change the beam angle $g$ during each rotation by an amount not greater than the beamwidth in order to secure complete coverage of the scanned area. The maximum value of $g$ may be, for example, 10°.

Rotation of the mirror is accomplished by motor 7 acting through variable speed drive 8. In order to obtain a constant writing speed of the scanning beam the speed of rotation of the mirror is made inversely proportional to the beam angle $g$, thus insuring a return signal from the target of uniform duration and strength throughout the scanned area. Such variation of scanning speed is the function of variable speed drive 8 which receives an input signal proportional to tilt angle from potentiometer 9 driven by the tilt mechanism.

Sine and cosine potentiometers 10 are driven by shaft 4 in synchronism with the scanner and produce voltage divisions proportional to the sine and cosine of $\theta$. The potentiometers are energized by a voltage, obtained from potentiometer 11, that is proportional to the tilt angle and therefore, for the small values of $g$ used, substantially proportional to R. The outputs of the sine and cosine potentiometers are therefore substantially equal to R sine $\theta$ and R cos $\theta$ and are applied to sampling relay K1. These voltages represent the U—D and R—L rectangular coordinates of the target with respect to the scanning axis and are the sources of the output signals of the seeker. These signals are applied to output terminals 12—13 when sampling relay K1 is actuated and storage devices 14—15 are operative, as will be seen later.

The tilt mechanism 5 is operated by a lead screw 16 driven through reversing clutch 17 from the output of variable speed drive 8. During the scanning phase the beam spirals outwardly until limit switch LS2 is actuated. Closure of this switch acts through reversing clutch control 18 to reverse the direction of rotation of lead screw 16. The beam then spirals inwardly until limit switch LS1 closes at zero tilt angle which again reverses lead screw 16. The above cycle repeats continuously during the scanning phase of operation.

When the beam encounters a target during the process of scanning an electrical pulse is produced by bolometer 3 which is amplified in preamplifier 19 and selective amplifier 20. The output of amplifier 20 is then processed in circuit 21 which selects the strongest target signal if more than one is present and produces therefrom a pulse of uniform amplitude and duration regardless of the strength and duration of the selected pulse. This pulse closes sampling relay K1 for the duration of the pulse each time a target signal is received. Actuation of K1 applies R sin $\theta$ and R cos $\theta$ voltages to storage devices 14 and 15 through contacts K1a and K1b and applies a voltage proportional to the beam angle $g$, obtained from potentiometer 22, through contacts K1C to lock-on control circuit 23. Therefore, relay K1 samples the R sin $\theta$ and R cos $\theta$ voltages and the beam angle voltage at potentiometer 22 each time a target pulse is received, however, the storage circuits 14—15 and lock-on circuit 23, which utilize these samples, are disabled by relay K2 until a predetermined number of target pulses, for example three, as determined by counter 24, have been received. This prevents the production of target information at output terminals 12—13 and interference with the normal scanning pattern until a definite target is encountered, as evidenced by repeated target pulses.

Actuation of relay K2 allows samples of the R sin $\theta$ and R cos $\theta$ voltages to be applied to storage devices 14—15 and thence to output terminals 12—13 to give up-down and right-left target information relative to the scanning axis. Actuation of relay K2 also allows lock-on control circuit 23 to take over control of the tilt reversing mechanism from reversing clutch control circuit 18 and limit switches LS1 and LS2 and to operate to limit the spiral scan to a small annulus containing the target, as illustrated in Figs. 2a and 2b. In these figures T represents the target and r the points at which tile reversals occur. To accomplish this, lock-on circuit 23 adds the remembered sample value of beam angle taken from potentiometer 22, which is of one polarity, with the instantaneous value of beam angle supplied from potentiometer 30 which is of the opposite polarity, and reverses the tilt mechanism when this sum, which is zero when the two values are equal, exceeds zero by a predetermined amount of either polarity. Counter 24 is basically a charge storing device and actuation of relay K2 also modifies its discharge time, through contacts K2d, to prevent opening of the relay before the expiration of a predetermined time interval after target pulses are no longer received. This, together with the memory feature of lock-on circuit 23 to be explained later, keeps the scan restricted to the target area for a period of time after the target has disappeared as a precaution against accidental loss of the target.

The details of the lock-on circuit 23 and the reversing clutch control circuit 18 are shown in Fig. 3. The lock-on circuit comprises tubes 25, 26A and 26B, while the clutch control circuit comprises tubes 27A, 27B and thyratrons 28 and 29. Voltages of equal amplitude and opposite polarity representing the instantaneous value of beam angle appear continuously at the taps of potentiometers 22 and 30 which are actuated by the tilt mechanism. As already stated, at each target pulse contacts K1C close causing condenser 31 to charge to a potential $+E$ equal to the potential at the tap of potentiometer 22 and representing the beam angle g at target interception. If the amplification of tube 25 is sufficiently high the gain of the cathode-follower stage of which it is a part is substantially unity so that $+E$ also appears in the voltage across output resistors 32 and 33. Resistors 48 and 49 form an adding circuit between tap 34 and the tap on potentiometer 30. The cathode follower stage is initially adjusted, by means of tap 34, so that with K2a open and $E=e$ in absolute value the grid of tube 26A is at ground potential. With this adjustment the sum of $+E$ and $-e$, or $E-e$, appears between the grid of tube 26A and ground whenever the circuit is in the lock-on phase of operation, i.e., during the time contacts K2a are open.

During the scanning phase, when no target pulses are received, contacts K2a are closed grounding the grid of tube 26A. Tubes 26A and 26B are then perfectly balanced so that the voltages applied from their anode circuits to the grids of tubes 27A and 27B are equal, switches LS1 and LS2 being open. Assuming that the tilting mechanism is in its outward phase, thyratron 29 is conductive and polarized relay 35 is actuated to the "Out" circuit of the reversing clutch. When the beam has reached the maximum tilt angle limit switch LS2 closes placing a more negative potential on the grid of tube 27A. This change in potential causes a sufficient rise in the grid potential of thyratron 28 to fire this tube. Firing of tube 28 is accompanied by a sudden rise in its cathode voltage which, when transmitted to the cathode of tube 29 through condenser 36, extinguishes this tube and allows relay 35 to be operated to the "In" circuit of the reversing clutch. The scanner then spirals inwardly until the tilt angle becomes zero at which time limit switch LS1 closes and relay 35 is operated back to the "Out" circuit. The above described scanning cycle is repeated continuously in the absence of a target in the scanned field.

Upon appearance of target pulses at the output of processing circuit 21 contacts K1c, as already pointed out, close momentarily at each pulse and allow condenser to charge to the potential E representing the beam angle at target interception. After three target pulses have been received contacts K2a open. Since K2a opens substantially in synchronism with the last of the three pulses the values of E and e will be nearly equal at that time. If the scanner is in its outward spiral e continues to decrease and the difference $E-e$, applied to the grid of tube 26A, becomes more positive causing the anode of this tube to become less positive. Further, the current through common cathode resistor 37 is increased which causes the grid of tube 26B to become more negative relative to its cathode and its anode to become more positive. Therefore, tube 26 acts as a phase inverter so that, with sufficient amplification in the tubes, a signal at the grid of tube 26A produces substantially equal oppositely phased signals at the anodes. Accordingly, an increasingly positive signal at the grid of 26A raises the potential of the grid of thyratron 28 and lowers the potential of the grid of thyratron 29 and eventually causes tube 28 to fire and tube 29 to be extinguished, thus reversing the tilt mechanism. The value of $E-e$, and hence the extent of the outward spiral beyond the target, required to reverse the tilt mechanism is determined by the gain of amplifiers 26 and 27. This gain is made such that about one revolution of the beam is made after intercepting the target before reversal takes place, as illustrated in Fig. 2a. After reversal, the beam spirals inwardly again intercepting the target and continuing on with e increasing until $E-e$ becomes negative enough to fire tube 29 and again reverse the tilt mechanism. The inward spiral is illustrated in Fig. 2b. In this manner the beam continues to spirally scan an annulus including the target and having a width determined by the gain of amplifier stages 26 and 27.

When target signals cease contacts K1c remain open and the voltage E, which remains on the condenser for some time due to its high impedance discharge path, represents the last recorded beam angle of the target. Since, as already stated, relay K2 is not deenergized immediately due to the time constant of counter circuit 24, contacts K2a remain open and the annular area last containing the target continues to be scanned for a sufficient time to prevent the loss of a single target pulse from terminating the lock-on phase. At the end of this period if no further target pulses occur relay K2 is deenergized and the grid of tube 26A grounded by closure of contacts K2a. The search phase is then reinitiated with switches LS1 and LS2 taking over the function of limiting the area scanned.

Fig. 4 shows the details of counter circuit 24. The negative target pulses passed by diodes 38 and 39 charge the R-C circuit 40—41—42—43. Tube 44 and associated circuits constitute a free running multivibrator the output of which is rectified by diode 45 and used to bias tube 46 beyond cut-off, thus maintaining K2 in a deenergized condition. When the potential across resistor 43 becomes sufficiently negative to block the multivibrator the bias on tube 46 disappears and K2 is energized. The R-C circuit is designed to require three target pulses to accomplish the above action. Resistor 47, connected across the R-C circuit when K2 is energized, serves to modify the time constant of the circuit to provide the required delay in deenergization of relay K2 to accomplish the desired period of scanning following the loss of target pulses as described above.

It is sometimes desirable to limit the scanning pattern to a disc of radius slightly greater than R rather than to an annulus as above described. Under these conditions the beam continues to scan an area from 0° out to one degree or so beyond the target. As the target approaches the axis of the seeker the outer limit of the scanned field is correspondingly reduced. The target repetition rate at wide target angles is not as great as for angular lock-on but increases to the same value at the center. This scanning method offers certain advantages in the re-acquisition of weak targets characterized by bad fading.

The lock-on circuit of Fig. 3 may be modified to operate in the above manner by opening switch S3. With S3 open, the increasingly positive value of $E-e$ which characterizes the outward spiral after target interception still operates through tube 26A to fire thyratron 28 and reverse the tilt mechanism. However, the increasingly negative value of $E-e$ which characterizes the inward spiral after target interception can not operate through tube 26B to fire thyratron 29 which must therefore await the closing of LS1 at the center.

We claim:

1. In a spiral scanner for a target seeker of the type having means forming a scanning beam and means for rotating the scanning beam about an axis fixed relative to the scanner and at the same time cyclically varying the angle between said beam and the axis of rotation from zero to a predetermined maximum value and back to zero, means operative upon interception of a target by said beam to limit the scanned field to an annulus containing said target, said limiting means comprising means for memorizing the beam angle at target interception, means for measuring the instantaneous beam angle, and means for reversing said beam angle varying means whenever said measured value differs in either direction from said memorized value by a predetermined amount.

2. A spiral scanner for a target seeker comprising means forming a scanning beam, means rotating said beam about an axis fixed relative to the scanner, means operating simultaneously with said rotating means for cyclically varying the angle between said beam and said axis of rotation from zero to a predetermined maximum value and back to zero, means actuated by said beam angle varying means and a signal produced by the interception of said target by said beam for producing and storing a voltage representing the beam angle at target intersection, means actuated by said beam angle varying means for producing a voltage representing the instantaneous beam angle, and means responsive to the difference between the latter voltage and the former voltage for reversing said beam angle varying means whenever said difference exceeds a predetermined amount in either direction.

3. A spiral scanner for a target seeker comprising means forming a scanning beam, means rotating said beam about an axis fixed relative to the scanner, means operating simultaneously with said rotating means for cyclically varying the angle between said beam and said axis of rotation from zero to a predetermined maximum value and back to zero, means operative upon interception of said target by said beam to limit the scanned field, said limiting means comprising means for memorizing the beam angle at target interception, means for measuring the instantaneous beam angle, and means for reversing said beam angle varying means whenever said measured value exceeds said memorized value by a predetermined amount.

4. A spiral scanning system for a target seeking missile, said system comprising means forming a scanning beam, means rotating said beam about an axis fixed relative to the scanner, a tilt mechanism operating simultaneously with said rotating means for cyclically varying the angle between said beam and said axis of rotation from zero to a predetermined maximum value and back to zero, means for producing a target signal each time said beam intercepts said target, means actuated by said tilt mechanism for generating two voltages of the same amplitude, said amplitude representing the instantaneous value of the beam angle, means actuated by said target signal for momentarily sampling one of said voltages, means to store said sample, means to obtain the difference between said other voltage and said stored sample, and means responsive to said difference voltage for reversing said tilt mechanism whenever said difference exceeds a predetermined amount.

5. Apparatus as claimed in claim 4 in which said last named means is provided with a disabling means, means for rendering said disabling means effective when no target signal has been produced for a predetermined period of time and means for rendering said disabling means ineffective when a predetermined number of successive signals have been produced by said target.

6. A spiral scanning system for a target seeking missile, said system comprising: means forming a scanning beam; means rotating said beam about an axis fixed relative to the scanner; a tilt mechanism operating simultaneously with said rotating means for cyclically varying the angle between said beam and said axis of rotation from zero to a predetermined maximum value and back to zero; means for producing a target signal each time said beam intercepts said target; means actuated by said tilt mechanism for generating two direct voltages of the same amplitude and opposite polarities, said amplitude representing the instantaneous value of the beam angle; a condenser; means actuated by said target signal for momentarily applying one of said voltages to said condenser for adjusting the charge on said condenser to conformity with said one voltage; an adding circuit; means for applying the condenser voltage and said other voltage thereto for producing a sum voltage having a polarity corresponding to the polarity of the greater of the two added voltages; and means responsive to said sum voltage for initiating operation of said tilt mechanism in a direction determined by the polarity of said sum voltage, when said sum voltage exceeds a predetermined amplitude.

7. Apparatus as claimed in claim 6 in which the means for applying said condenser voltage to said adding circuit comprises a cathode follower stage having said condenser in its input circuit and having its output circuit coupled to the adding circuit.

8. Apparatus as claimed in claim 7 in which said tilt mechanism has a pair of control circuits, one acting when energized to initiated operation of said mechanism in the outward direction and the other acting when energized to initiate operation of said mechanism in the inward direction; and in which said last named means comprises a pair of thyratrons each connected to one of said control circuits to energize same when the thyratron is conductive, a phase inverter stage for converting an input signal into two output signals of the same amplitude but opposite phases, means for applying said sum voltage to the input of said phase inverter stage, and means for applying one of said phase inverter output signals to the control grid of one of said thyratrons and the other output signal to the control grid of the other of said thyratrons.

9. Apparatus as claimed in claim 8 in which means are provided for extinguishing each of said thyratrons when the other is fired.

10. Apparatus as claimed in claim 9 in which outer and inner limit switches are attached to said tilt mechanism and in which said outer limit switch is connected to apply upon closure a positive-going voltage to the control grid of the thyratron connected to the inward control circuit of said tilt mechanism and said inner limit switch is connected to apply upon closure a positive-going voltage to the control grid of the thyratron connected to the outward control circuit of said tilt mechanism.

11. Apparatus as claimed in claim 10 in which means are provided for disabling the output of said phase inverter applied to the thyratron connected to the outward control circuit of said tilt mechanism.

No references cited.